US012709716B2

(12) United States Patent
Bruese

(10) Patent No.: US 12,709,716 B2
(45) Date of Patent: Aug. 18, 2026

(54) STABILITY OF SHORT PATH EVAPORATION TREATED OILS

(71) Applicant: CARGILL, INCORPORATED, Wayzata, MN (US)

(72) Inventor: Falk Bruese, Drensteinfurt (DE)

(73) Assignee: Cargill, Incorporated, Wayzata, MN (US)

( * ) Notice: Subject to any disclaimer, the term of this patent is extended or adjusted under 35 U.S.C. 154(b) by 428 days.

(21) Appl. No.: 18/181,697

(22) Filed: Mar. 10, 2023

(65) Prior Publication Data

US 2024/0301318 A1 Sep. 12, 2024

Related U.S. Application Data

(62) Division of application No. 16/608,420, filed as application No. PCT/US2018/029515 on Apr. 26, 2018, now Pat. No. 11,634,658.

(30) Foreign Application Priority Data

Apr. 26, 2017 (EP) .................................... 17168224
May 4, 2017 (EP) .................................... 17169482

(51) Int. Cl.
*C11B 5/00* (2006.01)
*A23D 9/04* (2006.01)
*A23L 33/115* (2016.01)

(52) U.S. Cl.
CPC .............. *C11B 5/0028* (2013.01); *A23D 9/04* (2013.01); *A23L 33/115* (2016.08)

(58) Field of Classification Search
CPC .................................................... A23D 7/0053
USPC .......................................................... 426/541
See application file for complete search history.

(56) References Cited

U.S. PATENT DOCUMENTS

| | | | |
|---|---|---|---|
| 10,894,931 B2 | 1/2021 | Brüse | |
| 2007/0021625 A1 | 1/2007 | Choo | |
| 2010/0021589 A1* | 1/2010 | Laskov | C11B 5/0014 426/546 |

FOREIGN PATENT DOCUMENTS

| | | |
|---|---|---|
| CN | 1899058 A | 1/2007 |
| CN | 104039750 A | 9/2014 |
| JP | 5230854 B1 | 7/2013 |
| WO | 00/49116 A1 | 8/2000 |
| WO | 2013/078187 A1 | 5/2013 |
| WO | 2013/084567 A1 | 6/2013 |
| WO | 2015/057139 A1 | 4/2015 |
| WO | 2015/058115 A1 | 4/2015 |
| WO | 2015/073359 A1 | 5/2015 |
| WO | 2015/091228 A1 | 6/2015 |
| WO | 2016/053971 A1 | 4/2016 |
| WO | 2016/132354 A1 | 8/2016 |
| WO | 2018/033899 A1 | 2/2018 |

OTHER PUBLICATIONS

Akoh et al., "Characterization and oxidative stability of enzymatically produced fish and canola oil-based structured lipids", Journal of the American Oil Chemists' Society, vol. 78, Issue 1, Jan. 2001, pp. 25-30.

Ben-Ali et al., "Stabilization of Sunflower Oil During Accelerated Storage: Use of Basil Extract as a Potential Alternative to Synthetic Antioxidants", International Journal of Food Properties, vol. 17, No. 7, Mar. 21, 2014, pp. 1547-1559.

Ifeduba et al., "Enzymatic Interesterification of High Oleic Sunflower Oil and Tripalmitin or Tristearin", Journal of the American Oil Chemists' Society, vol. 93, Issue 1, Nov. 30, 2015, pp. 61-67.

Isbell et al., "Oxidative stability index of vegetable oils in binary mixtures with meadowfoam oil", Industrial Crops and Products, vol. 9, Issue 2, Jan. 1, 1999, pp. 115-123.

Jacobsen et al., "Oxidative stability of mayonnaise containing structured lipids produced from sunflower oil and caprylic acid", European Journal of Lipid Science and Technology, vol. 105, Issue 8, Jul. 31, 2003, pp. 449-458.

Kahveci et al., "Chapter 6—Oxidative Stability of Enzymatically Processed Oils and Fats", Lipid Oxidation Challenges in Food Systems, 2013, pp. 211-242.

Lee et al., "Characterization of enzymatically synthesized structured lipids containing eicosapentaenoic, docosahexaenoic, and caprylic acids", Journal of the American Oil Chemists' Society, vol. 75, No. 4, Apr. 1998, pp. 495-499.

Li et al., "Antioxidants Inhibit Formation of 3-Monochloropropane-1,2-diol Esters in Model Reactions", Journal of Agricultural and Food Chemistry, vol. 63, Issue 44, Oct. 18, 2015, pp. 9850-9854.

Maduko et al., "Characterization and Oxidative Stability of Structured Lipids: Infant Milk Fat Analog", Journal of the American Oil Chemists' Society, vol. 85, Jan. 10, 2008, pp. 197-204.

Martin et al., "Oxidative stability of structured lipids", European Food Research and Technology, vol. 231, Jul. 21, 2010, pp. 635-653.

(Continued)

*Primary Examiner* — Brent T O'Hern

(57) ABSTRACT

The present invention relates to a process for increasing the oxidative stability of short path evaporated oils, by adding to short-path evaporated treated oil at least one other oil. It further relates to a composition comprising short-path evaporated treated palm oil and, at least one other oil. Furthermore, it relates to the food products comprising these oils with improved oxidative stability.

13 Claims, No Drawings

(56) References Cited

OTHER PUBLICATIONS

Product Brochure, “Thin Film and Short Path Distillation with Laboratory and Pilot Plants”, UIC GmbH, available online at <https://docplayer.net/46004091-Thin-film-and-short-path-distillation-with-laboratory-and-pilot-plants.html>.
Pudel et al., “3-MCPD- and glycidyl esters can be mitigated in vegetable oils by use of short path distillation” European Food Research and Technology, vol. 118, Issue 3 (Special Issue:Contaminants in fats and oils), May 22, 2015, pp. 396-405.
Shahidi et al., “Stabilization of Canola Oil by Natural Antioxidants”, Lipids in Food Flavors, vol. 558, Chapter 21, Jul. 7, 1994, pp. 301-314.
Turan et al., “Influence of sn-1,3-lipase-catalysed interesterification on the oxidative stability of soybean oil-based structured lipids”, Journal of the Science of Food and Agriculture, vol. 87, Issue 1, Oct. 11, 2006, pp. 90-97.
Zou et al., “Oxidative stability of structured lipid-based infant formula emulsion: Effect of antioxidants”, Food Chemistry, vol. 178, Jul. 1, 2015, pp. 1-9.
Zulkurnain et al., “Optimization of Palm Oil Physical Refining Process for Reduction of 3-Monochloropropane-1,2-diol (3-MCPD) Ester Formation”, Journal of Agricultural and Food Chemistry, vol. 61, No. 13, Apr. 3, 2013, pp. 3341-3349.

* cited by examiner

STABILITY OF SHORT PATH EVAPORATION TREATED OILS

CROSS-REFERENCE TO RELATED APPLICATIONS

This application is a divisional application of U.S. patent application Ser. No. 16/608,420, filed 25 Oct. 2019, issued as U.S. Pat. No. 11,634,658, which is a national phase application of PCT Application No. PCT/US2018/29515, filed 26 Apr. 2018, which claims the benefit of European Patent Application Serial No. 1768224.8, filed 26 Apr. 2017, entitled "STABILITY OF SHORT PATH EVAPORATION TREATED OILS" and European Patent Application Serial No. 17169482.1, filed 4 May 2017, entitled "STABILITY OF SHORT PATH EVAPORATION TREATED OILS", which applications are hereby incorporated by reference in their entirety.

FIELD OF THE INVENTION

Increase stability of short path evaporation (SPE)-treated oils by adding at least one other oil to the SPE treated oil.

BACKGROUND OF THE INVENTION

Crude oils, as extracted from their original source, are not suitable for human consumption due to the presence of high levels of contaminants—such as free fatty acids, phosphatides, soaps and pigments—which may be either toxic or may cause an undesirable colour, odour or taste. Crude oils are therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

Unfortunately, it has now been found that the refining process itself contributes to the introduction, of high levels of unwanted propanol components into the refined oil.

A lot of efforts have been taken to reduce the levels of these unwanted propanol components such as free chloropropanols, chloropropanol fatty acid esters, free epoxypropanols, epoxypropanol fatty acid esters, and combinations thereof. A lot of diverse processes have been developed in order to avoid, to mitigate or to reduce the content of these unwanted propanol components. These diverse processes each have been concerned with amending the process conditions of at least one or more of the standard refining steps.

Yet, there is still a need for a process allowing to obtain a vegetable oil with low or negligible amounts of these unwanted propanol components, while maintaining high quality in all other aspects of the oil.

The current invention provides such a process and such an oil.

SUMMARY OF THE INVENTION

The current invention relates to a process for oxidatively stabilizing oils treated with short path evaporation (SPE) comprising at least the step of:

Adding to SPE-treated oil at least one other oil while the SPE-treated oil has a peroxide value of below or equal to 1.5 milli-equivalent peroxide/kg and peroxide value is measured according to the AOCS Method Cd 8b-90.

It further relates to a composition comprising SPE treated palm oil and at least one other oil wherein the SPE-treated palm oil is having a content of di-acyl glycerides less than 3% and a content of unwanted propanol components of less than 0.8 ppm.

Finally it relates to a food product comprising the previously mentioned composition.

DETAILED DESCRIPTION

The current invention relates to a process for oxidatively stabilizing oils treated with short path evaporation (SPE) comprising at least the step of:

Adding to SPE-treated oil at least one other oil while the SPE-treated oil has a peroxide value of below or equal to 1.5 milli-equivalent peroxide/kg and peroxide value is measured according to the AOCS Method Cd 8b-90.

It further relates to the process of the invention wherein further at least one anti-oxidant is added.

Preferably the at least one other oil, or at least one other oil and at least one anti-oxidant are added while the SPE-treated oil has a peroxide value of below or equal to 1.0, 0.8, 0.7, 0.5 milli-equivalent peroxide/kg.

The SPE-treated oil is an oil having a content of di-acyl glycerides less than 3% and a content of unwanted propanol components of less than 0.8 ppm. In one aspect of the invention the SPE-treated oil is having a content of di-acyl glycerides less than 3%, less than 2.5%, less than 2%, less than 1.5% and a content of unwanted propanol components of less than 0.8 ppm, less than 0.7 ppm, less than 0.6 ppm, less than 0.5 ppm.

The term "stabilising oils" refers to the oxidative stability of oils. It is the resistance to oxidation during processing and storage. Oxidative stability is an important indicator to determine the oil quality and its shelf life. Oxidation of oil is very important in terms of palatability, nutritional quality, and toxicity of edible oils.

The oxidative stability is determined by different parameters that each define a different aspect of the oxidative stability.

The peroxide value is more linked to the "current" quality of the oil (measured at a specific moment in time) and it points out the state of oxidation of a substance. If oxidation proceeds over a certain period, it makes the oil rancid and gives an unpleasant smell for the substance. This oxidation is influenced by temperature of preservation, storage and by contact with air and light.

Once the oxidation process has progressed too far it is very hard if not impossible to restore its oxidative stability. This is in particular the case for an oil having a peroxide value rising above 1.5 or even above 1.0. Too many oxidation degradation products may have been created and each of these components may provide an off-taste and unpleasant smell which no longer can be masked.

The current process foresees that as long the peroxide value of the SPE-treated oil is not exceeding 1.5 milli-equivalent peroxide/kg, the oil can be stabilized by adding a suitable amount of at least one other oil or at least one other oil and at least one anti-oxidant.

The peroxide value is measured according to the AOCS Method Cd 8b-90.

In addition to the peroxide value, the oxidative stability over time (its shelf life in terms of oxidative stability) is assessed by methods for measurement of the induction time which characterizes the resistance of the oil to oxidation. The induction time is expressed as Oil Stability Index (OSI).

A suitable method can be the measurement using a Rancimat equipment (Metrohm) according to AOCS method Cd12b-92.

The current invention relates to the process of the invention further comprising the step of increasing the oxidative stability of the SPE-treated oil with at least 20%, compared to RBD oil.

The increase of the oxidative stability is obtainable by adding to the SPE-treated oil a suitable amount of at least one other oil, or at least one other oil and at least one anti-oxidant.

The term "suitable amount" of at least one other oil or at least one other oil and at least one anti-oxidant is the amount which allows an increase of the oxidative stability of the SPE treated oil with at least 20%, at least 25%, at least 30%, at least 40%, at least 50%, or at least 70%, at least 80%, at least 90%, at least 95% or at least 100% (according to relative improvement of OSI), each time compared to RBD oil. Most preferably, the amount is sufficient to allow the SPE-treated oil having an oxidative stability which is the same of, or similar to the oxidative stability of the corresponding refined (RBD) oil.

Surprisingly, it has been seen that SPE-treated oils have a significant lower OSI than the corresponding refined (RBD) oil and consequently they will have a significant shorter shelf-life.

It was surprisingly found that during SPE-treatment of the oil, the content of naturally present anti-oxidants may be reduced. This reduction may have an effect on the stability of the SPE-treated oil, and it no longer allows for a suitable shelf life of the SPE treated oil.

Furthermore, oil oxidation is an autocatalytic process. Since the reaction is, once it is started, self-propagating and it is accelerating exponentially, it is no longer feasible to improve or restore its stability sufficiently enough, especially once deterioration has reached a certain level. Additionally, the formed oxidation products such as aldehydes, ketones, furans, alcohols and other compounds are characterized by a low odor threshold value and are thus detected already in very small quantities as off-flavors in the oil.

The process of the current invention allows to re-establish, re-instate, or improve the oxidative stability of the SPE-treated oil.

The process of the current invention allows to increase the OSI of the SPE-treated oil with at least 20%, at least 25%, at least 30%, at least 40%, at least 50%, or at least 70%, at least 80%, at least 90%, at least 95% or at least 100%, most preferably up to or even higher than the OSI of the corresponding refined oil.

The term "SPE treated oil" further refers to an oil which has been treated by short path evaporation (SPE) and wherein the oil is derived from oils of any type, source or origin. They may be derived, for example, from one or more vegetable and/or animal sources and may include oils and/or fats from a single origin or blends of two or more oils and/or fats from different sources or with different characteristics. They may be derived from standard oils or from specialty oils such as low 3-MCPD oils, from modified or unmodified oils and/or fats (i.e. from oils in their natural state or oils that have been subjected to a chemical or enzymatic modification, to a hydrogenation, or to fractionation) and so on. Preferably, they will be derived from vegetable oils or vegetable oil blends. Examples of suitable vegetable oils include: soybean oil, corn oil, cottonseed oil, palm oil, peanut oil, rapeseed oil, safflower oil, sunflower oil, sesame seed oil, rice bran oil, canola oil and any fractions or derivatives thereof. According to a particularly preferred aspect of the invention, the refined oils of the present invention will be derived from palm oil.

Palm oil is encompassing palm oil, as well as palm oil fractions such as stearin and olein fractions (single as well as double fractionated, and palm mid fractions) and blends of palm oil and/or its fractions.

The term "anti-oxidant" refers to any type of product allowing to provide an increased resistance to oxidative degradation. The anti-oxidant is obtained from synthetic or natural source or it is a mixture of both.

Suitable antioxidants applicable in the current invention can be selected from the group consisting of butylated hydroxyanisole (BHA), butylated hydroxytoluene (BHT), propyl gallate (PG), tertiary-butylhydroquinone (TBHQ), citric acid, malic acid, succinic acid, tartaric acid, ascorbic acid, ascorbyl palmitate, erythorbic acid, carotenoids such as β-carotene, lycopene and lutein, synthetic tocopherols, plant extracts such as rosemary extract, green tea extract, carotenoids obtained from a natural source, lecithin, tocopherols, tocotrienols, phytosterols, phytostanols, olive oil phenolic compounds, phenolic compounds of sesam oil such, as sesamin, sesamol, sesamolin, sesaminol, sesamolinol, and the like. It has to be understood that for any of the aforementioned antioxidants and where it is applicable and would make sense, also their corresponding derivatives, including salts, esters, anhydrides and the like, are likewise to be considered as suitable antioxidants.

The "at least one other oil" is selected from any type of oil that itself is anti-oxidant or provides protective properties against oxidation due to its specific composition. The "at least one other oil" can be selected from a crude or natural oil (e.g. virgin olive oil, sesame seed oil and the like) or it can be a refined oil. The refined oil can be of the same botanical source as the SPE-treated oil resulting a composition of oils that only differ in their pre-treatment. For example refined palm oil may be added to SPE-treated palm oil.

Alternatively, this "at least one other oil" may be of a different botanical source than the SPE treated oil and as such the needs of the final product may be accommodated.

The term "refined oil" refers to an oil which quality is suitable for human consumption and more in particular is suitable for use in infant food. Such an oil has received at least one refining step selected from degumming, dewaxing, caustic refining, bleaching, deodorization, or any combination of two or more thereof. Each of these steps is explained in more detail here below. The "refined oil" used in the current invention has not been treated with short path evaporation. The quality of this refined oil is determined according to methods well-known in the art and its good quality is identified by parameters such as low content of residual FFA, high oxidative stability, light color and/or a bland/neutral taste. The oil has been refined by at least one refining step such that contaminants such as pesticides, poly-aromatic hydro carbons and mycotoxins have been removed up to a level that meets the food regulations in place.

The "at least one other oil" may be a deodorized oil which is obtained by a classical refining process or preferably by an alternative refining process although not including short path evaporation, but allowing to reduce the quantity of unwanted propanol components such as defined below, but still having protective properties against oxidation due to its specific composition and thus allowing for a normal shelf life of thus obtained oil composition of the refined oil and the SPE-treated oil.

Usually before further food processing, the SPE-treated oil is handled, preserved, stored and/or transported at a temperature of from the melting point of the SPE-treated oil up to 30° C. above its melting point. Preferably the oil is handled, preserved, stored and/or transported at a temperature from above its melting point up to 20° C. above its melting point, more preferably from 5° C. above its melting point up to 10° C. above its melting point.

Short Path Evaporation (SPE)

Short path evaporation (SPE) or alternatively named short path distillation is a distillation technique or thermal separation technique operating at process pressures in the range of below 1 to below 0.001 mbar. It involves a technique wherein the distillate is travelling a short distance, often only a few centimetres, at reduced pressure. This technique is often used for compounds which are unstable at high temperatures or to purify small amounts of a compound. The advantage is that the heating temperature can be considerably lower (at reduced pressure) than the boiling point of the liquid at standard pressure, and the distillate only has to travel a short distance before condensing. A short path ensures that almost no compound is lost on the sides of the apparatus.

The short path evaporation is performed to reduce, remove, and mitigate the content of unwanted propanol components such as free chloropropanols, chloropropanol fatty acid esters, free epoxypropanols, epoxypropanol fatty acid esters, and combinations thereof.

The short-path evaporation is performed at a temperature of from 90 to 280° C., preferably from 140° C. to 260° C.

To reduce the content of propanol components selected from epoxypropanol fatty acid esters the short path evaporation is performed at a temperature of from 140 to 210° C., preferably from 150 to 200° C.

A temperature of from 200 to 280° C., preferably from 220° C. to 270° C., more preferably from 240° C. to 260° C. is used to reduce the content of propanol components selected from chloropropanol fatty acid esters.

Furthermore, the short path evaporation is performed at a pressure below 1 mbar, preferably below 0.05 mbar, more preferably below 0.01 mbar, most preferably below 0.001 mbar.

Unless specified otherwise, the content of the unwanted propanol components as mentioned above either alone or in combination will be determined using Method DGF Standard Methods Section C (Fats) C-VI 18(10).

The total content of the unwanted propanol components is reduced by at least 30%, most preferably it is reduced by at least 50%, at least 70%, at least 90%, at least 95% wherein said reduction is corresponding to the decrease in the amount of unwanted propanol components of the SPE-treated oil compared with the amount in the corresponding oil before the SPE treatment.

It further relates to the process of the current invention wherein the at least one other oil, or the at least one other oil and at least one anti-oxidant is added while collecting the SPE-treated oil from SPE equipment (=in-line addition process), preferably at a temperature above the melting point of the SPE-treated oil, preferably at a temperature above 50° C., above 75° C., above 100° C., or even above 150° C.

For at least some of the anti-oxidants, the addition of a suitable amount may be rather cumbersome due to the high melting point and/or low solubility of the anti-oxidant in the oil. Adding the anti-oxidant while collecting the SPE-treated oil through in-line dosing system, or shortly after exciting the SPE equipment will allow the addition of the at least one anti-oxidant or at least part of the at least one anti-oxidant at a temperature above the melting point of the anti-oxidant, preferably at a temperature above 50° C., above 70° C., more preferably above 100° C., preferably above 120° C., even more close to a temperature of 150° C. or above 150° C. Preferably, in the process of the current invention wherein the at least one antioxidant is comprising ascorbyl palmitate, the addition of this anti-oxidant is performed while the SPE-treated oil is having a temperature above 100° C., or even above 150° C.

In another aspect of the invention it relates to the claimed process wherein the at least one other oil, or the at least one other oil and at least one anti-oxidant, is added in a period of less than 1 minute to up to 15 days and the addition is taking place at a temperature in the range of from the melting point of the SPE-treated oil up to 30° C. above its melting point, preferably 50° C. above its melting point, or even 70° C. above its melting point or 100° C. above its melting point, after collecting for storage and/or handling the SPE-treated oil. This seems particularly relevant in the process wherein the SPE-treatment is followed by further refining and/or processing steps. By adding no later than 15 days, the at least one other oil, or the at least one other oil and at least one anti-oxidant, the oxidative stability of the SPE-treated oil is improved. Preferably the at least one other oil, or the at least one other oil and at least one anti-oxidant is added in less than 5 days, less than 1 day, less than 1 hour, less than 5 minutes, less than 1 minute after SPE-treatment. Meanwhile (in the period of up to 15 days) the SPE-treated oil is stored, handled and/or transported at a temperature of from the melting point of the SPE-treated oil to 30° C. above its melting point.

Alternatively, in the process wherein the SPE-treatment is followed by refining and/or processing steps, the at least one other oil, or the at least one other oil and at least one anti-oxidant is added in less than 15 days, less than 5 days less than 1 day, less than 1 hour, less than 5 minutes, less than 1 minute after the last processing step that is following the SPE-treatment and most preferably before storing and/or transporting the SPE-treated oil.

The current invention relates to the process wherein the SPE-treated oil has been obtained from SPE treatment prior and/or after at least one refining and/or processing step. Preferably the SPE treated oil is obtained from SPE treatment after at least one refining step. The "at least one refining and/or processing step" may include degumming and/or alkali refining, bleaching and/or deodorization step, and/or modifications such as interesterification.

Preferably the "at least one refining and/or processing step" is a bleaching step. More preferably the "at least one refining and/or processing step" is a deodorization step.

The "at least one refining and/or processing step" may include even more than one bleaching and/or more than one deodorization step.

The "at least one refining and/or processing step" is here outlined below.

Degumming

Any of a variety of degumming processes known in the art may be used. One such process (known as "water degumming") includes mixing water with the crude oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming, enzymatic degumming (e.g., ENZYMAX from Lurgi) or chemical degumming (e.g., SUPERIUNI degumming from Unilever or TOP degumming from VandeMoortele/Dijkstra CS).

Alkali or Caustic Refining

If so desired, crude or degummed oil may be refined via alkali refining. In alkali refining, the oil is commonly mixed with a hot, aqueous alkali solution, producing a mixture of partially refined or "neutral" oil and soapstock. The soapstock is then separated off and the partially refined oil is delivered to the next refining step.

Bleaching

The crude or partially refined oil may then be delivered to a bleaching system. The nature and operation of the bleaching system will depend, at least in part, on the nature and quality of the oil being bleached. Generally, the raw or partially refined oil will be mixed with a bleaching agent which combines with oxidation products, trace phosphatides, trace soaps, and other compounds adversely affecting the colour and flavour of the oil. As is known in the art, the nature of the bleaching agent can be selected to match the nature of the crude or partially refined oil to yield a desirable bleached oil. Bleaching agents generally include natural or "activated" bleaching clays, also referred to as "bleaching earths", activated carbon and various silicates. A skilled person will be able to select a suitable bleaching agent from those that are commercially available.

Deodorising

The crude, partially refined or bleached oil may undergo a physical refining step referred to as "deodorising". The deodorising process and its many variations and manipulations are well known in the art. Preferably, it will include introducing the oil into a deodoriser and contacting it with steam to vaporize and drive off free fatty acids (FFAs) and other volatile impurities, resulting in a deodorised oil and a vapour stream.

The deodoriser may be any of a wide variety of commercially available deodorizing systems, including both multi-chamber deodorisers (such as those sold by Krupp of Hamburg, Germany; De Smet Group, S A. of Brussels, Belgium; Gianazza Technology s.r.l. of Legnano, Italy; Alfa Laval AB of Lund, Sweden, or others) and multi-tray deodorisers (such as those sold by Krupp, DeSmet Group, S.A., and Crown Ironworks of the United States).

The deodoriser is desirably maintained at an elevated temperature and a reduced pressure to better volatilise the FFAs and other volatile impurities. The precise temperature and pressure may vary depending on the nature and quality of the oil being processed. Most often, the deodoriser will be maintained at a pressure of no greater than 10 mm Hg. Preferably, it will be maintained at a pressure of no greater than 5 mm Hg, e.g., 1-4 mm Hg.

The temperature in the deodoriser may be varied as desired to optimize the yield and quality of the deodorised oil. At higher temperatures, reactions which may degrade the quality of the oil will proceed more quickly. For example, at higher temperatures, cis-fatty acids may be converted into their less desirable trans form. Operating the deodorizer at lower temperatures may minimize the cis-to-trans conversion, but will generally take longer to remove the requisite percentage of volatile impurities. For most vegetable oils, maintaining the oil at a temperature of 200° C. or higher should suffice. In many circumstances, an oil temperature of about 230-285° C. is suitable, with temperatures of about 240-270° C. being useful for many oils.

In a useful physically refining of palm related oil, the deodoriser will be maintained at a pressure of 2-3 mm Hg and the oil will be heated to a temperature of about 260-270° C. Temperatures of about 240-250° C. and pressures of about 1-4 mm Hg are appropriate for deodorizing hydrogenated oils and alkali-refined soybean oil, rapeseed oil and sunflower oil. For physical refining of coconut oil or palm kernel oil, temperatures of about 240-245° C. and pressures of about 1-4 mm Hg are preferred. Coconut oil which has been alkali refined may be deodorised at a lower temperature of about 200-220° C. and at a pressure of about 2-3 mm Hg. The exact temperature and pressure to be used in any given situation will readily be determined by the skilled person.

A quantity of steam is delivered to the deodoriser, e.g. through low-pressure steam lines (at 1-5 Bar for example), and is then sprayed into the oil. As the steam, which may be superheated, bubbles through the oil, it will help strip it of its FFAs and other volatile impurities. The flow rate of steam through the oil will vary depending on the nature and quality of the oil being deodorised and the pressure and temperatures in the deodoriser. Generally, though, steam flow rates in the order of 0.7-2.5 weight percent (wt. %) of the oil flow rates should suffice for most common processing conditions. This produces a steam-containing vapour stream which is delivered from the deodoriser to one or more condensers.

Modification

In addition to the above refining steps, the process of the present invention may also include one or more modification steps. These may be selected from one or more chemical, physical or enzymatic modifications or any combination thereof. The process may include one or more esterification or interesterification and/or fractionation steps.

Oil modification is generally applied to change the melting and crystallization properties of an oil. Fractionation is used to separate liquid and solid fractions of an oil through crystallization, resulting in two oil products, one with a decreased melting point and one with an increased melting point. Esterification or interesterification is a process in which fatty acids are either randomly or in a targeted manner exchanged along the glycerol backbone. The exchange can take place between two or more different types of oils or within a single oil in order to randomize the distribution of fatty acids along the glycerol backbone.

The timing of these modifications will of course depend on the desired end composition and the skilled person will be able to determine their preferred order. For example, the oils may be modified before or after anyone of the other refining steps.

The current invention further relates to a composition comprising SPE-treated palm oil and at least one other oil, wherein the SPE-treated palm oil is having a content of di-acyl glycerides of less than 3% and a content of unwanted propanol components of less than 0.8 ppm. and/or at least one further anti-oxidant.

In another aspect of the invention it relates to the composition of the invention wherein the composition is comprising from 20 wt. % SPE treated palm oil and up to 80 wt % of the at least one other oil. The at least one other oil is present in an amount of at least 3 wt %, at least 5 wt %, at least 10 wt %.

Furthermore, the composition of the invention may include at least one further anti-oxidant in an amount of 5 to 5000 ppm, preferably from 10 to 2500 ppm, from 50 to 2000 ppm, from 100 to 1000 ppm, from 150 to 500 ppm.

Furthermore, the composition of the current invention may be added to other sources of fat that will find applications in final consumer products.

In another aspect of the invention, it relates to a food product comprising food ingredients selected from the group consisting of carbohydrates, proteins, fats and mixtures of two or more thereof and the composition of the invention.

Preferably, the food product is infant food, food for elderly people, confectionary, margarine, frying oil, table oil or salad dressing.

Infant food is a term well-known in the art and it refers to food that is specifically manufactured for infants and it may be characterized in that is soft, and easily consumable by infants and has a nutritional composition adapted to the specific needs at each growth stage.

Food for elderly people is a term well-known in the art and it is taking into account the nutritional needs of elderly people. Food for elderly people is a calorically dense formulation that provides increased energy and nutrition with minimum amount of fluid.

In fact, once the oxidative stability of the SPE-treated oil is established by preparing the oil composition of the current invention it may be blended with any other food ingredient for preparing a food product. The ingredient may be based on oils, proteins and/or carbohydrates. Further micronutrients may be added according to the habit or needs of the final consumer.

The current invention further relates to the use of the composition of the present invention in the preparation of food products.

It further relates to the use wherein the food product is infant food, food for elderly people, confectionary, margarine, frying oil, table oil or salad dressing.

The invention will hereunder be illustrated in following examples.

EXAMPLES

SPE treated palm oil was obtained starting from refined, bleached and deodorized palm oil (=RBD palm oil) from Cargill. A Short Path Evaporation unit KDL-5 from UIC was used. The following conditions were applied:

Feed temperature: 70° C.

Condenser temperature: 80° C.

Distillate temperature: 160° C.

Wiper speed: 366 rpm

Pressure: 4-6 $10^4$ mbar

Evaporator temperature: 260° C.

Flow setting: 20 rpm

Oxidation stability (OSI)(at temperature of 120° C.) and peroxide value (PV) of the fresh SPE treated palm oil was measured. Results are displayed in Table 1.

The SPE treated palm oil (Reference 1) was stored at 55° C. After storage for a specific time period as indicated in Table 1, peroxide value (PV) of the oil was measured and the oil was blended with fresh RBD palm oil (Cargill) (Reference 2) as indicated in table 1. OSI and PV of the fresh RBD palm was measured before blending.

The degree of oxidation stability improvement (% OS improvement) was expressed as the percentage of change in OSI in the blend relative to the OSI of the SPE treated oil (Reference 1) and the OSI of the fresh RBD palm oil (Reference 2).

3-MCPD and GE content in fresh RBD palm oil and SPE treated palm oil were measured.

A reduction of 94% of MCPD derivatives and a reduction of 99% glycidyl derivatives was obtained in the SPE-treated oil.

TABLE 1

| | Reference 1 | Reference 2 | Example 1 | Example 2 | Example 3 |
|---|---|---|---|---|---|
| % SPE palm oil | 100 | — | 90 | 75 | 90 |
| PV before blending | 0.002 | 0.025 | 0.157 | 0.157 | 1.212 |
| Storage time | 0 days | 0 days | 1 day | 1 day | 11 days |
| % fresh RBD palm oil | — | 100 | 10 | 25 | 10 |
| OSI after addition | 4 | 13.3 | 7.9 | 12.6 | 6.1 |
| % Oxidative stability improvement | | | 41.9 | 92.5 | 22.6 |

The invention claimed is:

1. A process for oxidatively stabilizing an oil treated with short path evaporation (SPE), the process comprising:

adding to SPE-treated oil 5 wt % or more of at least one other oil by weight of combined oils, forming an oxidatively stabilized oil, while the SPE-treated oil has a peroxide value of below or equal to 1.5 milli-equivalent peroxide/kg and peroxide value is measured according to the AOCS Method Cd 8b-90, wherein the SPE-treated oil comprises SPE-treated palm oil and the at least one other oil comprising a refined palm oil not treated with SPE, wherein the SPE-treated oil has been obtained from at least one of a SPE treatment prior to at least one refining or processing step, a SPE treatment after at least one refining or processing step, or combinations thereof, and wherein the process increases the oxidative stability of the oxidatively stabilized oil by 20% or more, relative to the SPE-treated palm oil, as measured by the Oil Stability Index (OSI).

2. The process according to claim 1, wherein the at least one refining or processing step is a bleaching step.

3. The process according to claim 1, wherein the at least one refining or processing step is a deodorization step.

4. The process according to claim 1, wherein the at least one refining or processing step comprises degumming, alkali refining, bleaching, deodorization, interesterification, or a combination of two or more thereof.

5. The process of claim 1, wherein the SPE-treated oil comprises less than 0.8 ppm of propanol components comprising chloropropanols, chloropropanol fatty acid esters, free epoxypropanols, epoxypropanol fatty acid esters, and combinations thereof.

6. The process of claim 1, wherein the oxidatively stabilized oil comprises 75 wt % to 90 wt % of the SPE-treated oil.

7. The process of claim 1, wherein the at least one other oil is present in the oxidatively stabilized oil in an amount of 10 wt % to 25 wt %.

8. The process of claim 1, further comprising adding to the SPE-treated oil at least one anti-oxidant in an amount of 5 to 5000 ppm, by weight of the oxidatively stabilized oil.

9. The process of claim 8, wherein the at least one anti-oxidant is added to the SPE-treated oil within 1 minute and 15 days of being treated by SPE.

10. The process of claim 8, wherein the at least one anti-oxidant is added to the SPE-treated oil above a melting point of the at least one anti-oxidant.

11. The process of claim 8, wherein the at least one anti-oxidant is selected from butylated hydroxyanisole (BHA), butylated hydroxytoluene (BHT), propyl gallate (PG), tertiary-butylhydroquinone (TBHQ), citric acid, malic acid, succinic acid, tartaric acid, ascorbic acid, ascorbyl palmitate, erythorbic acid, carotenoids, synthetic tocopherols, rosemary extract, green tea extract, lecithin, tocopherols, tocotrienols, phytosterols, phytostanols, olive oil phenolic compounds, sesamin, sesamol, sesamolin, sesaminol, sesamolinol, and combinations, salts, esters, and anhydrides thereof.

12. The process of claim 1, wherein the process increases the oxidative stability of the SPE-treated oil by 40% or more, as measured by the Oil Stability Index (OSI).

13. The process of claim 1, wherein the SPE-treated oil comprises less than 3% of di-acyl glycerides.

* * * * *